United States Patent
Kim

(10) Patent No.: US 12,082,290 B2
(45) Date of Patent: Sep. 3, 2024

(54) METHOD AND APPARATUS FOR PERFORMING MEASUREMENT IN AND CONDITIONAL RECONFIGURATION NON-TERRESTRIAL NETWORK

(71) Applicants: Soenghun Kim, Hanam-si (KR); BLACKPIN Inc., Seoul (KR)

(72) Inventor: Soenghun Kim, Hanam-si (KR)

(73) Assignees: BLACKPIN Inc., Seoul (KR); Soenghun Kim, Hanam-si (KR)

( * ) Notice: Subject to any disclaimer, the term of this patent is extended or adjusted under 35 U.S.C. 154(b) by 0 days.

(21) Appl. No.: 18/597,977

(22) Filed: Mar. 7, 2024

(65) Prior Publication Data

US 2024/0215105 A1 Jun. 27, 2024

Related U.S. Application Data

(63) Continuation of application No. PCT/KR2022/018972, filed on Nov. 28, 2022.

(30) Foreign Application Priority Data

Dec. 6, 2021 (KR) .......................... 10-2021-0173231

(51) Int. Cl.
*H04W 76/20* (2018.01)
*H04W 76/27* (2018.01)

(52) U.S. Cl.
CPC .................................. *H04W 76/27* (2018.02)

(58) Field of Classification Search
None
See application file for complete search history.

(56) References Cited

U.S. PATENT DOCUMENTS

| | | |
|---|---|---|
| 2020/0045573 A1 | 2/2020 | Kim |
| 2020/0187033 A1 | 6/2020 | Tang et al. |
| 2021/0176682 A1 | 6/2021 | Yi et al. |

FOREIGN PATENT DOCUMENTS

KR 1020190117647 A 10/2019

OTHER PUBLICATIONS

International Search Report for International Patent Application No. PCT/KR2022/018972, dated Mar. 16, 2023.
ZTE corporation et al., "Consideration on CHO and measurements," 3GPP TSG-RAN WG2 Meeting#116-e, Electronic, R2-2110469, Nov. 1-12, 2021.
Ericsson, "Stage-3 running RRC CR for NTN Rel-17," 3GPP TSG-RAN WG2 Meeting #116-e, Electronic Meeting, R2-2110710, Nov. 1-12, 2021.

(Continued)

*Primary Examiner* — Gary Lafontant
(74) *Attorney, Agent, or Firm* — PnK IP LLC

(57) ABSTRACT

A Method and Apparatus for measurement and conditional reconfiguration in non-terrestrial network is provided. The method includes receiving a measurement configuration IE and a conditional reconfiguration IE, performing conditional reconfiguration evaluation based on the measurement configuration IE and a conditional reconfiguration IE, considering the first cell as a triggered cell and applying the stored condRRCReconfig IE of the first cell. In the evaluation, at least two comparisons are performed based on a distance hysteresis and distance between the terminal and one or more reference positions.

6 Claims, 10 Drawing Sheets

(56) References Cited

OTHER PUBLICATIONS

3GPP TS 38.331 V16.7.0 (Dec. 2021); Technical Specification; 3rd Generation Partnership Project; Technical Specification Group Radio Access Network; NR; Radio Resource Control (RRC) protocol specification(Release 16).

3GPP TS 38.321 V16.7.0 (Dec. 2021); Technical Specification; 3rd Generation Partnership Project; Technical Specification Group Radio Access Network; NR; Medium Access Control (MAC) protocol specification(Release 16).

3GPP TS 38.323 V16.6.0 (Dec. 2021); Technical Specification; 3rd Generation Partnership Project; Technical Specification Group Radio Access Network; NR; Packet Data Convergence Protocol (PDCP) specification (Release 16).

3GPP TS 38.306 V16.6.0 (Sep. 2021); Technical Specification; 3rd Generation Partnership Project; Technical Specification Group Radio Access Network; NR; User Equipment (UE) radio access capabilities (Release 16).

Qualcomm Incorporated, "Open issues in CHO," 3GPP TSG-RAN WG2 Meeting #116-e,E-Meeting, R2-2109971, Nov. 1-12, 2021.

Qualcomm Incorporated, "SMTC and MG enhancements," 3GPP TSG-RAN WG2 Meeting #116e, E-Meeting, R2-2109972, Resubmission of R2-2107566, Nov. 1-12, 2021.

Huawei et al., "Discussion on CHO in NTN," 3GPP TSG RAN WG2 #116-e, Online, R2-2110276, Nov. 1-12, 2021.

Ericsson, "Connected mode aspects for NTN," 3GPP TSG-RAN WG2 Meeting #116 electronic, Online, R2-2110340, Nov. 1-12, 2021.

Nokia et al., "[116-e][103][NTN] SMTC/gaps (Nokia)," 3GPP TSG-RAN WG2 Meeting #116 Electronic, Elbonia, R2-2111333, Nov. 1-12, 2021.

Ericsson, "Stage-3 running RRC CR for NTN Rel-17," 3GPP TSG-RAN WG2 Meeting #116-e, Electronic Meeting , R2-2111337, Nov. 1-12, 2021.

Nokia et al., "[AT116-e][103][NTN] SMTC and gaps (Nokia)," 3GPP TSG-RAN WG2 Meeting #116 Electronic, Elbonia, R2-2111340, Nov. 1-12, 2021.

Nokia et al., "[AT116-e][103][NTN] SMTC and gaps—second phase (Nokia)," 3GPP TSG-RAN WG2 Meeting #116 Electronic, Elbonia, R2-2111353, Nov. 1-12, 2021.

3GPP TS 38.323 V16.5.0 (Sep. 2021); Technical Specification; 3rd Generation Partnership Project; Technical Specification Group Radio Access Network; NR; Packet Data Convergence Protocol (PDCP) specification (Release 16).

Ericsson, "Stage-3 running RRC CR for NTN Rel-17," 3GPP TSG-RAN WG2 Meeting #116-e, Electronic Meeting, R2-2111614, Nov. 1-12, 2021.

METHOD AND APPARATUS FOR PERFORMING MEASUREMENT IN AND CONDITIONAL RECONFIGURATION NON-TERRESTRIAL NETWORK

CROSS-REFERENCE TO RELATED APPLICATION

This application is a continuation of International Application No. PCT/KR2022/018972, filed on Nov. 28, 2022, which claims priority to and the benefit of Korean Patent Application No. 10-2021-0173231, filed on Dec. 6, 2021, the disclosure of which is incorporated herein by reference in its entirety.

BACKGROUND

Technical Field

The present disclosure relates to measurement and conditional reconfiguration in non-terrestrial network.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e.g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability. In addition, in the 5G communication system, a non-terrestrial network is introduced with the goal of supporting a very high data rate and very low transmission delay in order to support various services.

To increase the coverage of 5G communication system, non-terrestrial network is introduced wherein part of the communication link is established between terminal and satellite. To tackle the long propagation delay in the NTN, various enhancements are required.

SUMMARY

Aspects of the present disclosure are to address measurement and conditional reconfiguration in non-terrestrial network. The method includes receiving a measurement configuration IE and a conditional reconfiguration IE, performing conditional reconfiguration evaluation based on the measurement configuration IE and a conditional reconfiguration IE, considering the first cell as a triggered cell and applying the stored condRRCReconfig IE of the first cell. In the evaluation, at least two comparisons are performed based on a distance hysteresis and distance between the terminal and one or more reference positions.

DETAILED DESCRIPTION

Figure 1A:
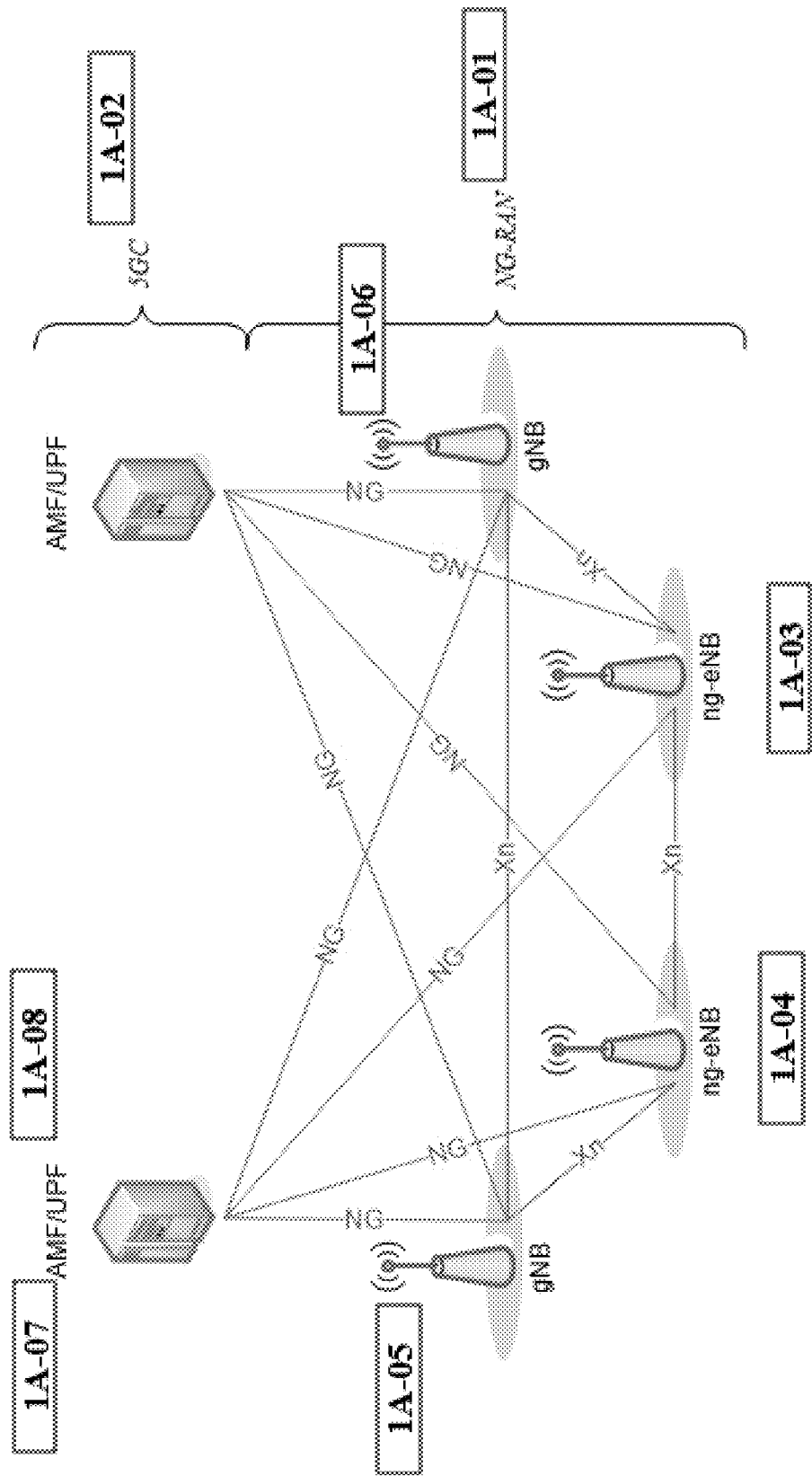
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
| --- | --- | --- | --- |
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |

TABLE 1-continued

| Acronym | Full name | Acronym | Full name |
|---|---|---|---|
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell |
| NG-RAN | NG Radio Access Network | SRB | Signalling Radio Bearer |
| NR | NR Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | CCCH | Common Control Channel |
| PLMN | Public Land Mobile Network | DL | Downlink |
| PRACH | Physical Random Access Channel | UL | Uplink |
| PRB | Physical Resource Block | RAR | Random Access Response |
| PSS | Primary Synchronisation Signal | SMTC | synchronization signal/physical broadcast channel block measurement timing configuration |
| PUCCH | Physical Uplink Control Channel | SS/PBCH | synchronization signal/physical broadcast channel |
| PUSCH | Physical Uplink Shared Channel | SSB-MTC | synchronization signal/physical broadcast channel block-Measurement Timing configuration |

Table 2 lists the terminologies and their definition used throughout the present disclosure.

TABLE 2

| Terminology | Definition |
|---|---|
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |

TABLE 2-continued

| Terminology | Definition |
| --- | --- |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply The cell is part of either the selected PLMN or the registered PLMN or PLMN of the Equivalent PLMN list The cell is not barred The cell is part of at least one TA that is not part of the list of "Forbidden Tracking Areas for Roaming" (TS 22.011 [18]), which belongs to a PLMN that fulfils the first bullet above. The cell selection criterion S is fulfilled (i.e. RSRP and RSRQ are better than specific values |

In the present invention, "trigger" or "triggered" and "initiate" or "initiated" can be used interchangeably.

In the present invention, UE and terminal can be used interchangeably. In the present invention, NG-RAN node and base station can be used interchangeably.

FIG. 1a is a diagram illustrating the architecture of an 5G system and a NG-RAN to which the disclosure may be applied.

5G system consists of NG-RAN (1a-01) and 5GC (1a-02). An NG-RAN node is either:

a gNB, providing NR user plane and control plane protocol terminations towards the UE; or an ng-eNB, providing E-UTRA user plane and control plane protocol terminations towards the UE.

The gNBs 1a-05 or 1a-06 and ng-eNBs 1a-03 or 1a-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1a-07 and UPF 1a-08 may be realized as a physical node or as separate physical nodes.

A gNB 1a-05 or 1a-06 or an ng-eNBs 1a-03 or 1a-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1a-07 hosts the functions such as NAS signaling, NAS signaling security, AS security control, SMF selection, Authentication, Mobility management and positioning management.

The UPF 1a-08 hosts the functions such as packet routing and forwarding, transport level packet marking in the uplink, QoS handling and the downlink, mobility anchoring for mobility etc.

Figure 1B:
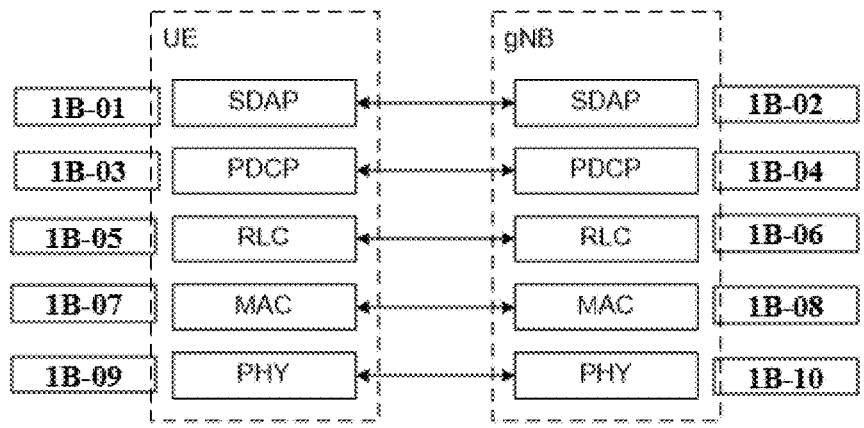
FIG. 1B is a diagram illustrating a wireless protocol architecture in an 5G system to which the disclosure may be applied.
Figure 1B:
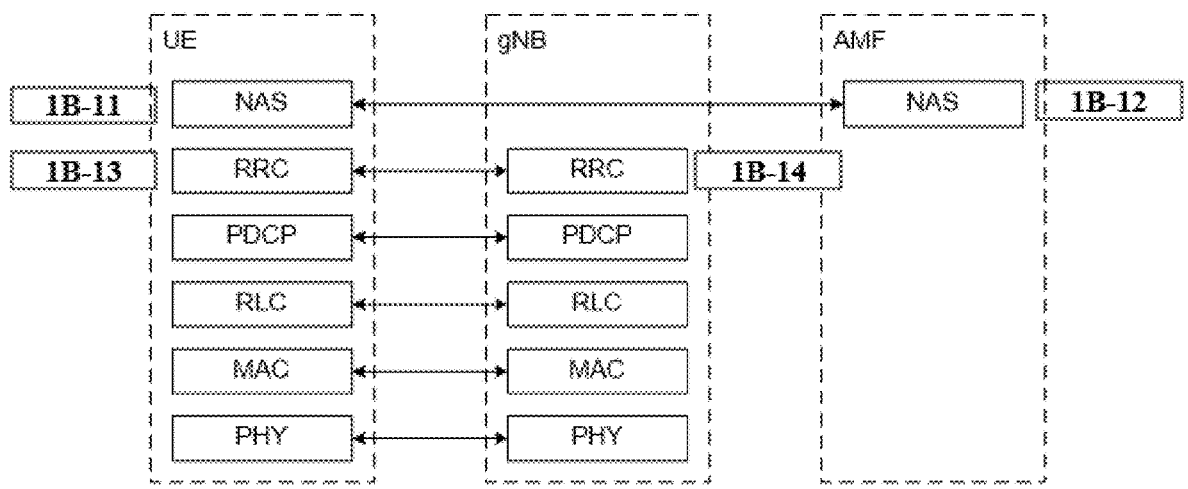

FIG. 1B is a diagram illustrating a wireless protocol architecture in an 5G system.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
| --- | --- |
| NAS | authentication, mobility management, security control etc |

TABLE 3-continued

| Sublayer | Functions |
|---|---|
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG- RAN; DRX for RAN paging configured by NG-RAN; 5GC-NG-RAN connection (both C/U-planes) is established for UE; The UE AS context is stored in NG-RAN and the UE; NG-RAN knows the RNA which the UE belongs to. |
| RRC_CONNECTED | 5GC-NG-RAN connection (both C/U-planes) is established for UE; The UE AS context is stored in NG-RAN and the UE; NG-RAN |

TABLE 4-continued

| RRC state | Characteristic |
|---|---|
| | knows the cell which the UE belongs to; Transfer of unicast data to/from the UE; Network controlled mobility including measurements. |

Figure 1C:
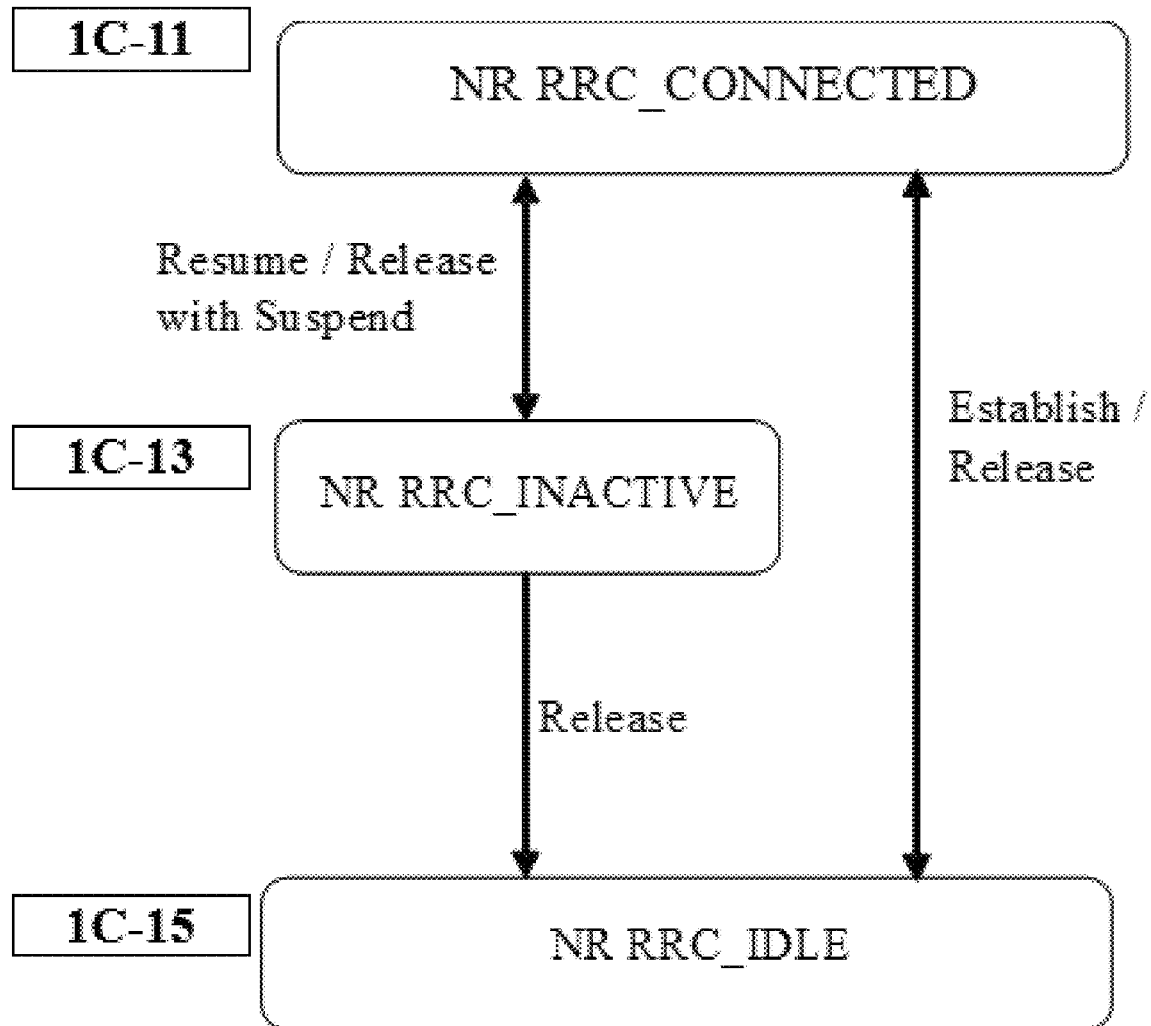
FIG. 1C is a diagram illustrating RRC state transition.

FIG. 1C is a diagram illustrating an RRC state transition. Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

SuspendConfig IE includes the following information.
<SuspendConfig>
1. The first terminal identifier: an identifier of a terminal that may be included in the ResumeRequest when a state transition to RRC_CONNECTED is made. It has a 40-bit length.
2. The second terminal identifier: an identifier of a terminal that may be included in the Resume Request when a state transition to RRC_CONNECTED is made. It has a 24-bit length.
3. ran-Paging Cycle: Paging cycle to be applied in RRC_INACTIVE state.
4. ran-Notification AreaInfo: Configuration information of a ran-Notification Area consisting of a list of cells and the like. The terminal initiates a resume procedure when the ran_Notification Area is changed.
5. t380: Timer related to the periodic resumption procedure.
6. NextHopChangingCount (NCC): Counter used to derive new security keys after performing the resume procedure.
7. Extended-ran-Paging-Cycle: Paging cycle to be applied in RRC_INACTIVE when extended DRX is configured. It indicates one of predefined values: rf256, rf512, rf1024 and a reserved value.

Figure 1D:
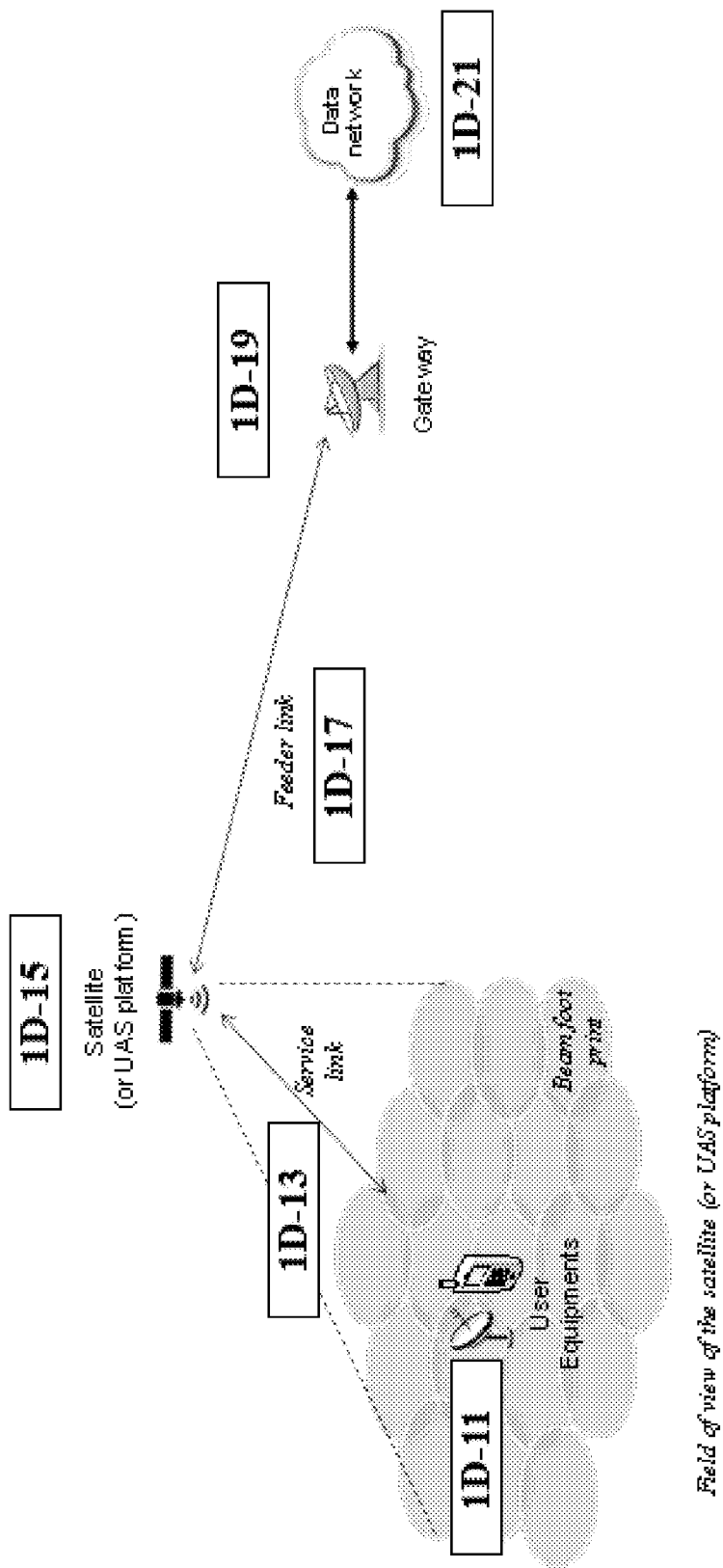
FIG. 1D is a diagram illustrating architecture of NTN.

FIG. 1D is a diagram illustrating architecture of NTN.

A non-terrestrial network refers to a network, or segment of networks using RF resources on board a satellite (or UAS platform).

The typical scenario of a non-terrestrial network providing access to user equipment is depicted in FIG. 1D.

Non-Terrestrial Network typically consists of the following elements:

One or several sat-gateways 1D-19 that connect the Non-Terrestrial Network to a public data network 1D-21. A Feeder link 1D-17 or radio link between a sat-gateway and the satellite. A service link 1D-13 or radio link between the user equipment and the satellite. A satellite 1D-15 providing RF resource. User Equipment 1D-11 served by the satellite within the targeted service area.

Figure 1E:
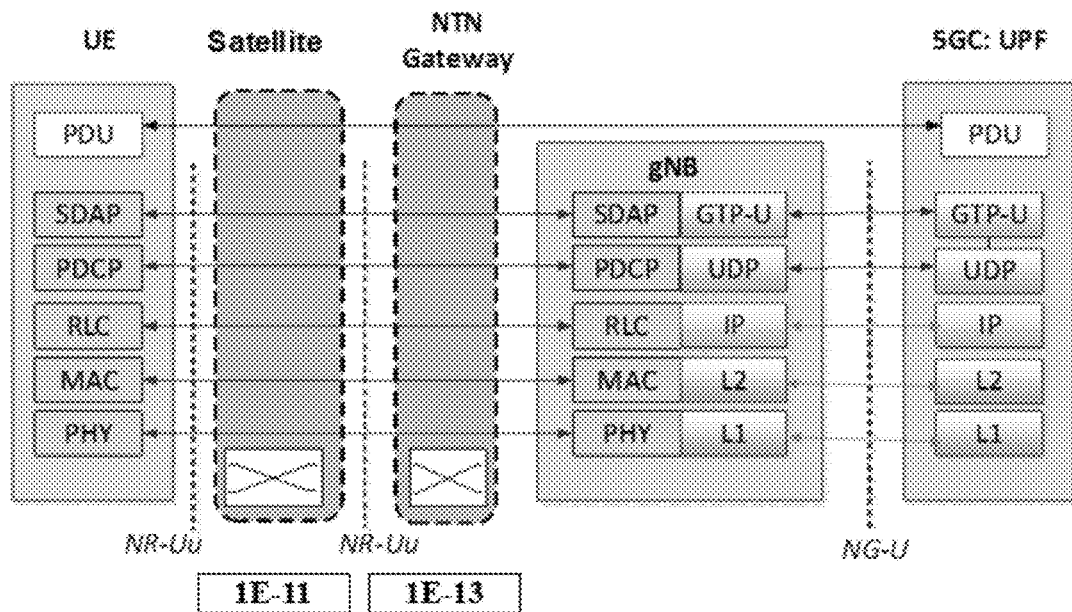
FIG. 1E is a diagram illustrating protocol architecture of NTN.
Figure 1E:
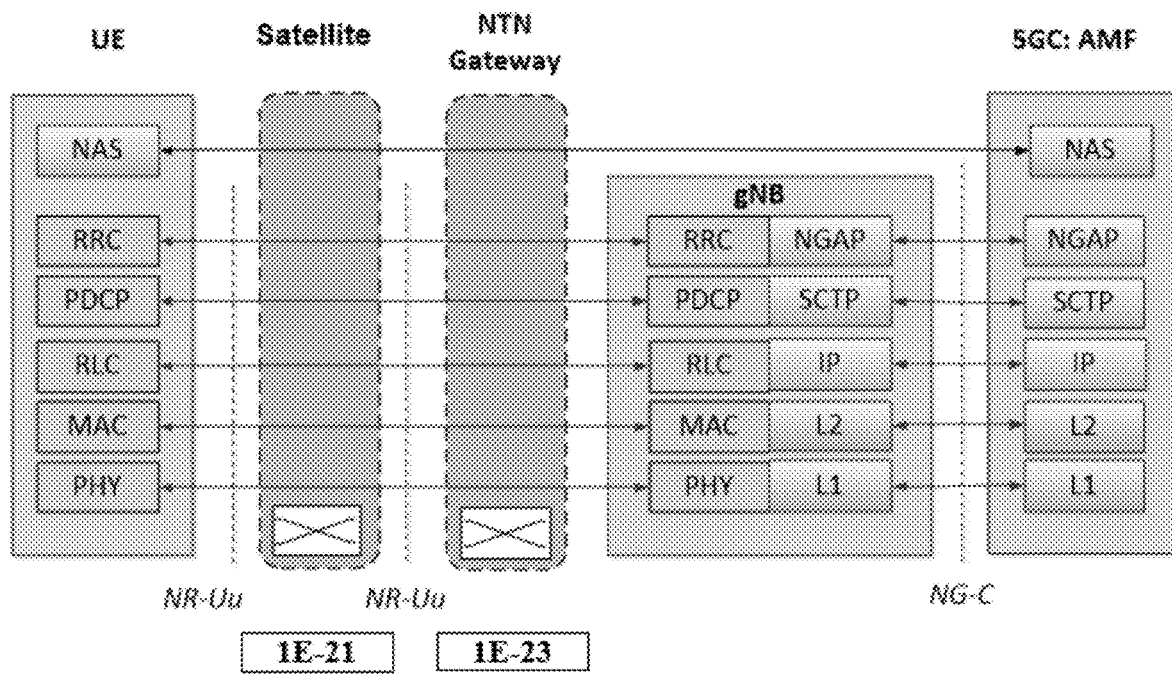

FIG. 1E is a diagram illustrating protocol architecture of NTN.

Satellite 1E-11 or 1E-21 and NTN gateway 1E-13 and 1E-23 are equipped with RF processing & Frequency Switching to relay the signal between gNB and UE. Other protocols such as SDAP, PDCP, RLC, MAC, PHY, RRC, NAS are same as used in normal terrestrial network.

Figure 1F:
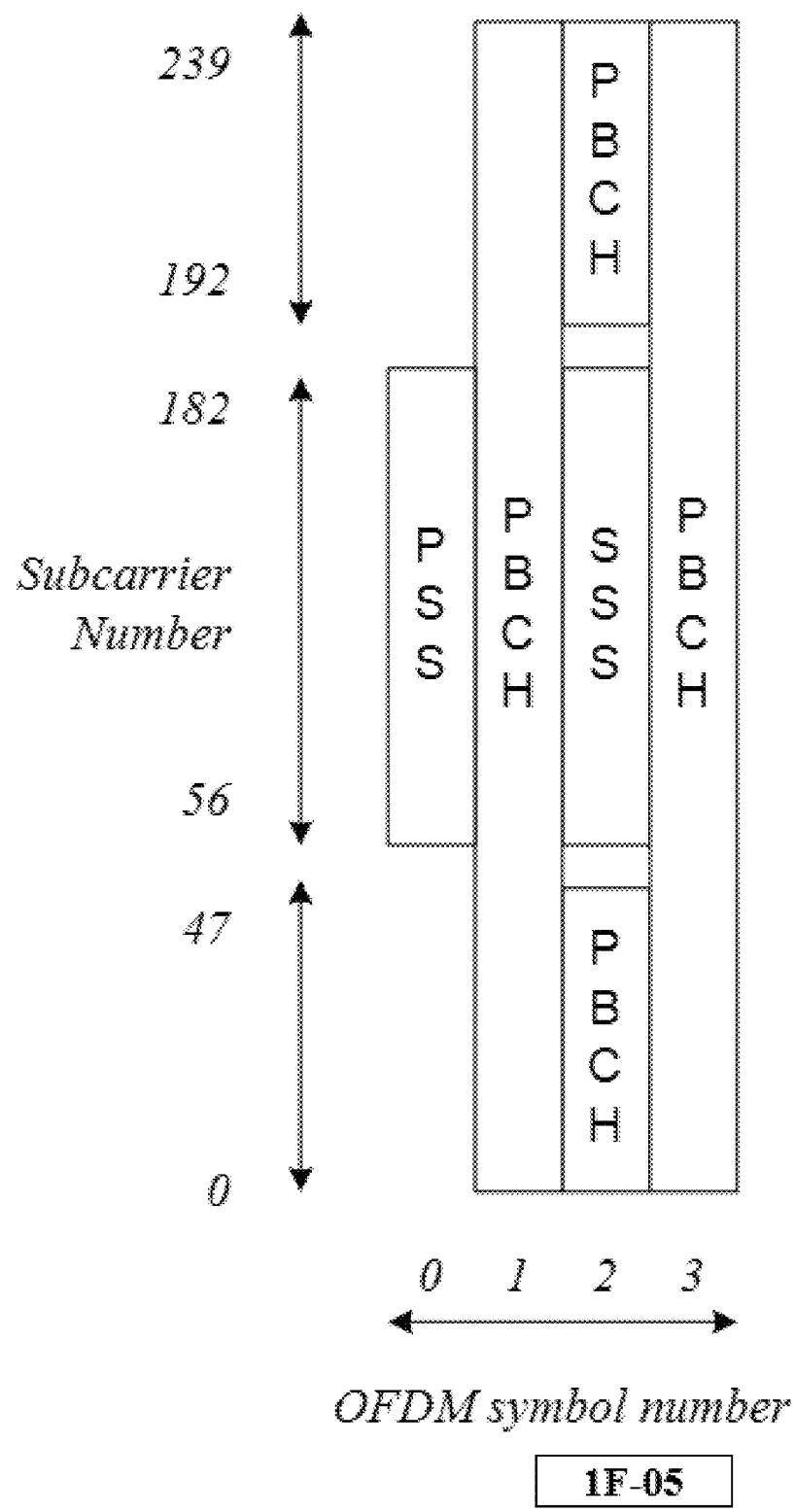
FIG. 1F is a diagram illustrating SS/PBCH.

FIG. 1F is a diagram illustrating SS/PBCH.

The Synchronization Signal and PBCH block (SSB) consists of primary and secondary synchronization signals (PSS, SSS), each occupying 1 symbol and 127 subcarriers, and PBCH spanning across 3 OFDM symbols 1F-05 and 240 subcarriers, but on one symbol leaving an unused part in the middle for SSS as show in FIG. 1F. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

The length of a half-frame is 5 ms. The periodicity of a half-frame is 5 ms or 10 ms or 20 ms or 40 ms or 80 ms or 160 ms. UE tries to measure SSBs during the half-frame. Base station can configure UE with SMTC for SSB measurement. SMTC can be configured in accordance with the half-frame.

In general, half-frames of cells in a same frequency are synchronized. Hence only one SMTC is required. However, in NTN, due to long propagation delay half-frames between neighbour cells can be received in different point of time depending on UE location. It requires plurality of SMTCs if UE needs to measure plurality of neighbor cells.

Figure 2A:
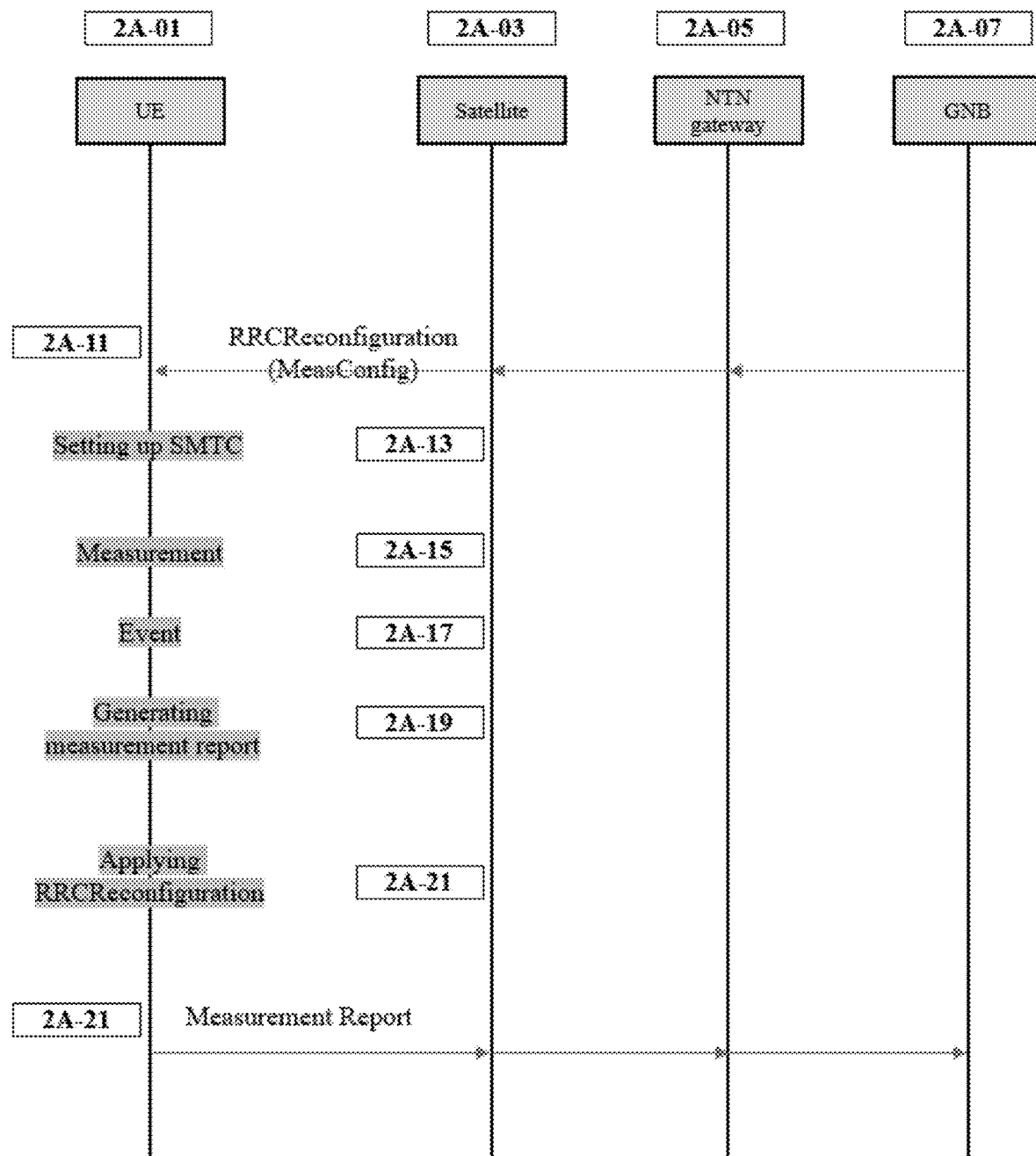
FIG. 2A is a diagram illustrating operations of a terminal and a base station according to an embodiment of the present invention.

FIG. 2A is a diagram illustrating the operation of UE and GNB according to the embodiment of the invention.

In 2A-11, GNB 2A-07 determines measurement configuration for UE 2A-01. GNB transmits, to UE via NTN gateway 2A-05 and Satellite 2A-03, RRCReconfiguration message. RRCReconfiguration message includes measConfig IE based on determined measurement configuration. measConfig IE includes plurality of measObject IEs and plurality of ReportConfig IEs and plurality of MeasIdToAddMod IEs.

a MeasObject IE specifies information applicable for SSBs intra/inter-frequency measurements. a MeasObject IE includes following IEs; ssbFrequency IE, ssbSubcarrierSpacing IE, smtc1 IE, smtc2 IE, smtc3list IE, ssb-ToMeasure IE, etc. smtc1 is primary measurement timing configuration for SS Synchronization Signal). smtc2 is secondary measurement timing configuration for SS. smtc3list is measurement timing configuration list for SS corresponding to neighbor cells having different SSB time patterns. ssbFrequency IE indicates the frequency of the SS associated with this MeasObjectNR. ssbSubcarrierSpacing is subcarrier spacing of SSB. ssb-ToMeasure is the set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured. ReportConfig IE specifies criteria for triggering of an NR measurement reporting event or of a CHO (Conditional Handover) event. A ReportConfig IE comprises a reportType IE. A reportType IE may include one of eventTriggered IE and condTriggerConfig IE. A eventTriggered IE specifies criteria for triggering of a measurement reporting event. A condTriggerConfig IE specifies criteria for triggering of a CHO event.

A MeasIdToAddMod includes a measId and a measObjectId and a reportConfigId. The measId is associated with the measObject indicated by the measObjectId and the reportConfig indicated by the reportConfigId.

GNB can determine to configure UE with conditional reconfiguration. GNB includes plurality of CondReconfigToAddMod IEs in the RRCReconfiguration messsage, if determined so. A CondReconfigToAddMod IE includes following IEs; a condReconfigId IE, a condExecutionCond IE and a condRRCReconfig IE.

A condExecutionCond IE is the execution condition that needs to be fulfilled in order to trigger the execution of a conditional reconfiguration for a candidate cell. When configuring 2 triggering events (Meas Ids) for a candidate cell, if both events are related to reference signal measurement, network ensures that both refer to the same measObject.

A condRRCReconfig IE is the RRCReconfiguration message to be applied when the condition(s) are fulfilled. The RRCReconfiguration message includes the configuration information of a candidate target cell.

In 2A-13, UE configure measurement timing configuration based on received measConfig IE. For each measObject IE included in the measConfig IE. UE setup SMTC (SS/PBCH block measurement timing configuration) for each measObject based on smtc1, smtc 2 and smtc3 list.

smtc1 comprises a SSB-MTC (Measurement Timing Configuration) IE. A SSB-MTC IE includes a periodicityAndOffset IE and a duration IE. It is a primary measurement timing configuration.

smtc2 comprises a SSB-MTC2 IE. A SSB-MTC2 IE includes pci-List IE and periodicity IE. It is a secondary measurement timing configuration applied to the cells listed in pci-List. The secondary measurement timing configuration has a different periodicity and a same offset comparing to the primary measurement timing configuration. smtc2 is an optional IE.

smtc3List IE comprises plurality of SSB-MTC3 IEs. a SSB-MTC3 IE includes a pci-List IE and a offset IE. smtc3List is used for the case where neighbor cell's offset is different, due to significantly different propagation delay, from what is indicated by the primary measurement timing. It is mainly used in NTN network. smtc3List is an optional IE. If smtc3List IE is present and smtc1 IE is not present in a measObject IE, UE is unable to comply with RRCReconfiguration and initiates the connection re-establishment procedure.

UE setup the first SMTC in accordance with the received periodicity AndOffset parameter in the smtc1 configuration.

The first subframe of each SMTC occasion occurs at an SFN and subframe of the NR SpCell meeting the following condition:

$SFN \bmod T = (FLOOR\ (Offset/10));$ if the Periodicity is larger than sf5:

subframe=Offset mod 10;

else:

subframe=Offset or (Offset +5);

with T=CEIL(Periodicity/10).

periodicity and offset are derived from periodicityAndOffset IE. A periodicityAndOffset IE is an integer chosen from a integer set. Six integer sets are defined for periodicityAndOffset. The lowest integer is 0 for all six integer sets. The highest value of six integer sets are 4, 9, 19, 39, 79 and 159 respectively. If the integer is chosen from the integer set with highest value of n, periodicity is sf_n+1 and the offset is the chosen integer. For example, if integer 15 is chosen from the integer set with highest value of 159, periodicity is sf160 and the offset is 15.

sf5 is five subframes, sf10 is ten subframes and so on.

If smtc2 is present, for cells indicated in the pci-List parameter in smtc2 in the same MeasObject, the UE shall setup an additional SMTC in accordance with the received periodicity parameter in the smtc2 configuration and use the Offset and duration parameter from the smtc1 configuration. The first subframe of each SMTC occasion occurs at an SFN and subframe of the NR SpCell meeting the above condition.

If smtc3list is present, for cells indicated in the pci-List parameter in each SSB-MTC3 element of the list in the same MeasObject IE, the UE shall setup an additional SS block measurement timing configuration in accordance with the received offset parameter from each SSB-MTC3 configuration and use the periodicity and duration parameters from the smtc1 configuration. The first subframe of each SMTC occasion of each SSB-MTC3 configuration occurs at an SFN and subframe of the NR SpCell meeting the above condition. The offset IE of each SSB-MTC3 is an integer selected (or determined) from the same integer set as used in the smtc1 for the periodicity determination.

If smtc3list is present, UE setup an additional SS block measurement timing configuration for each SSB-MTC3 element in accordance with the received offset parameter from each SSB-MTC3 element and in accordance with the periodicity and the duration from smtc1 IE. In other words, offset parameter of a SSB-MTC3 element is valid for (and applied to setup) SS block measurement timing configuration of the SSB-MTC3 element. duration parameter of smtc1 IE is valid for (and applied to setup) SS block measurement timing configuration of the smtc1 IE and SS block measurement timing configurations of the plurality of SSB-MTC3 elements in the same measObject IE. periodicity determined based on periodicity AndOffset IE of a smtc1 IE is valid for (and applied to) SS block measurement timing configuration of the smtc1 IE and SS block measurement timing configurations of the plurality of SSB-MTC3 elements in the same measObject IE.

In 2A-15, UE performs measurement for SS/PBCH block during the SMTC occasions established in step 2A-13. UE derives cell measurement results based on measurements on SS/PBCH blocks during the SMTC occasions.

In 2A-17, UE determines for each measId if the event corresponding with the eventId of the corresponding reportConfig is fulfilled. UE initiate the measurement reporting procedure for the measId if the event is fulfilled.

A reportConfig IE can include an eventTriggered IE. An eventTriggered IE includes an eventId IE and a rsType IE. A rsType IE indicates one of ssb and csi-rs. UE performs measurement on the indicated reference signal. An eventId IE is defined for each of following event types.

Event A1: Serving becomes better than absolute threshold;
Event A2: Serving becomes worse than absolute threshold;
Event A3: Neighbour becomes amount of offset better than PCell/PSCell;
Event A4: Neighbour becomes better than absolute threshold;
Event A5: PCell/PSCell becomes worse than absolute threshold1 AND Neighbour/SCell becomes better than another absolute threshold2;
Event A6: Neighbour becomes amount of offset better than SCell;
Event D1: Distance between UE and a reference location referenceLocation1 becomes larger than configured threshold Thresh1 and distance between UE and a reference location referenceLocation2 becomes shorter than configured threshold Thresh2

For event D1, An eventId IE includes distanceThresFromReference1 IE, distanceThresFromReference2 IE, referenceLocation1 IE, referenceLocation2 IE and HysteresisLocation IE.

distanceThresFromReference1 indicates a first distance threshold in meter. distanceThresFromReference2 indicates a second distance threshold in meter. referenceLocation1 is a GNSS coordinates and indicates the location of the first reference. referenceLocation2 is a GNSS coordinates and indicates the location of the second reference. HysteresisLocation is the hysteresis in meter.

The UE consider the entering condition for event D1 to be satisfied when both conditions are fulfilled.

<Event D1 Conditions>
measured location 1+HysteresisLocation>distance ThresFromReference1; AND
measured location 2−HysteresisLocation<distanceThresFromReference1

Alternatively, the conditions can be defined by applying the hysteresis only to one condition as below.
measured location 1>distanceThresFromReference1; AND
measured location 2−HysteresisLocation<distanceThresFromReference1 or
measured location 1+HysteresisLocation>distance ThresFromReference1; AND
measured location 2<distanceThresFromReference1
measured location 1 is the UE location represented by the distance between UE and a reference location parameter for this event (i.e., referenceLocation1 as defined within reportConfig for this event).
measured location 2 is the UE location represented by the distance between UE and a reference location parameter for this event (i.e., referenceLocation2 as defined within reportConfigNR this event).

UE determines for each measId included in the condExecutionCond IE associated to conReconfigId if the event corresponding with the condEventId of the corresponding condTriggerConfig is fulfilled. UE initiate the conditional reconfiguration execution for a target candidate cell if the events associated to all measIds within condTriggerConfig for the target candidate cell are fulfilled.

A reportConfig IE associated with the measId within the condExecutionCond IE includes a condTriggerConfig IE. A condTriggerConfig IE includes a condEventId IE and a rsType IE. A rsType IE indicates one of ssb and csi-rs. UE performs measurement on the indicated reference signal. A condEventId IE is defined for each of the following conditional event types.

CondEvent A3: Conditional reconfiguration candidate becomes amount of offset better than PCell/PSCell;
CondEvent A4: Conditional reconfiguration candidate becomes better than absolute threshold;
CondEvent A5: PCell/PSCell becomes worse than absolute threshold1 AND Conditional reconfiguration candidate becomes better than another absolute threshold2;
CondEvent D1: Distance between UE and a reference location referenceLocation1 becomes larger than configured threshold Thresh1 and distance between UE and a reference location referenceLocation2 of conditional reconfiguration candidate becomes shorter than configured threshold Thresh2;
CondEvent T1: Time measured at UE becomes more than configured threshold Thresh1 but is less than Thresh2;

For CondEevent D1, a condEventId IE includes distanceThresFromReference1 IE, distanceThresFromReference2 IE, referenceLocation1 IE, referenceLocation2 IE and HysteresisLocation IE.

The UE consider the entering condition for CondEvent D1 to be satisfied when two conditions for Event D1 are fulfilled.

For CondEvent A5, condEventId includes following IEs; a5-Threshold1, a5-Threshold2 and hysteresis.

The UE consider the entering condition for CondEvent A5 to be satisfied when both conditions are fulfilled.

Measurement result of the NR SpCell+Hysteresis<a5-Threshold1; AND

Measurement result of the neighbouring cell+measurement object specific offset of the neighbouring cell+cell specific offset of the neighbouring cell−Hysteresis>a5-Threshold2 measurement object specific offset and cell specific offset of the neighbouring cell are included in the corresponding measObject IE.

The UE variable VarMeasConfig includes the accumulated configuration of the measurements to be performed by the UE, covering intra-frequency, inter-frequency and inter-RAT mobility related measurements. VarMeasConfig includes a list of measIds, a list of measObjects, a list of reportConfig, etc.

The UE variable VarConditionalReconfig includes the accumulated configuration of the conditional handover or conditional PSCell change configurations including the pointers to conditional handover or conditional PSCell change execution condition (associated measId(s)) and the stored target candidate SpCell RRCReconfiguration.

VarConditionalReconfig includes a list of CondReconfigToAddModList.

For each condReconfigId within the VarConditionalReconfig, UE consider the cell which has a physical cell identity matching the value indicated in the ServingCellConfigCommon included in the reconfigurationWithSync in the received condRRCReconfig to be applicable cell.

For each measId included in the measIdList within VarMeasConfig indicated in the condExecutionCond associated to condReconfigId, UE consider the event associated to that measId to be fulfilled if the entry condition(s) applicable for this event associated with the condReconfigId, i.e. the event corresponding with the condEventId(s) of the corresponding condTriggerConfig(or condExecutionCond) within VarConditionalReconfig, is fulfilled for the applicable cells.

If event(s) associated to all measId(s) within condTriggerConfig (or condExecutionCond) for a target candidate cell within the stored condRRCReconfig are fulfilled, UE consider the target candidate cell within the stored condRRCReconfig, associated to that condReconfigId, as a triggered cell;

If more than one triggered cell exists, UE selects one of the triggered cells as the selected cell for conditional reconfiguration execution.

If two measIds are included in condExecutionCond associated with a condReconfigId and if one measId is associated with CondEvent A5 and the other measId is associated with the CondEvent D1, UE considers the target candidate cell associated with the condReconfigId as a triggered cell when four conditions (two associated with the first MeasId and two associated with the second MeasId) are fulfilled.

If two events are specified for a conditional reconfiguration (or conditional handover), and if the first event is CondEvent A5 and the second event is CondEventD1, the conditional reconfiguration is executed when four conditions are fulfilled simultaneously.

Both events can refer to a different measObject if one of the events is CondEventD1 or CondEventT1.

In 2A-19, UE generates a MeasurementReport message based on the measurement result on the measurement object. This step is skipped if conditional reconfiguration is executed.

UE sets a measId field of the MeasurementReport message to the measurement identity that triggered the measurement reporting.

UE sets a measurement result serving cell field of the Measurement Report message to include RSRP and RSRQ and the available SINR of PCell based on the rsType indicated in the associated ReportConfig.

UE sets a location field of the MeasuremntReport message to include the distance between UE and the first reference location and the distance between UE and the second reference location if the measId is associated with event D1.

In 2A-21, UE transmits the MeasurementReport message to the GNB via Satellite 2A-03 and NTN gateway 2A-05, if measurement reporting procedure is initiated.

UE applies the condRRCReconfig of the selected (target candidate) cell if conditional reconfiguration is executed.

Figure 3A:
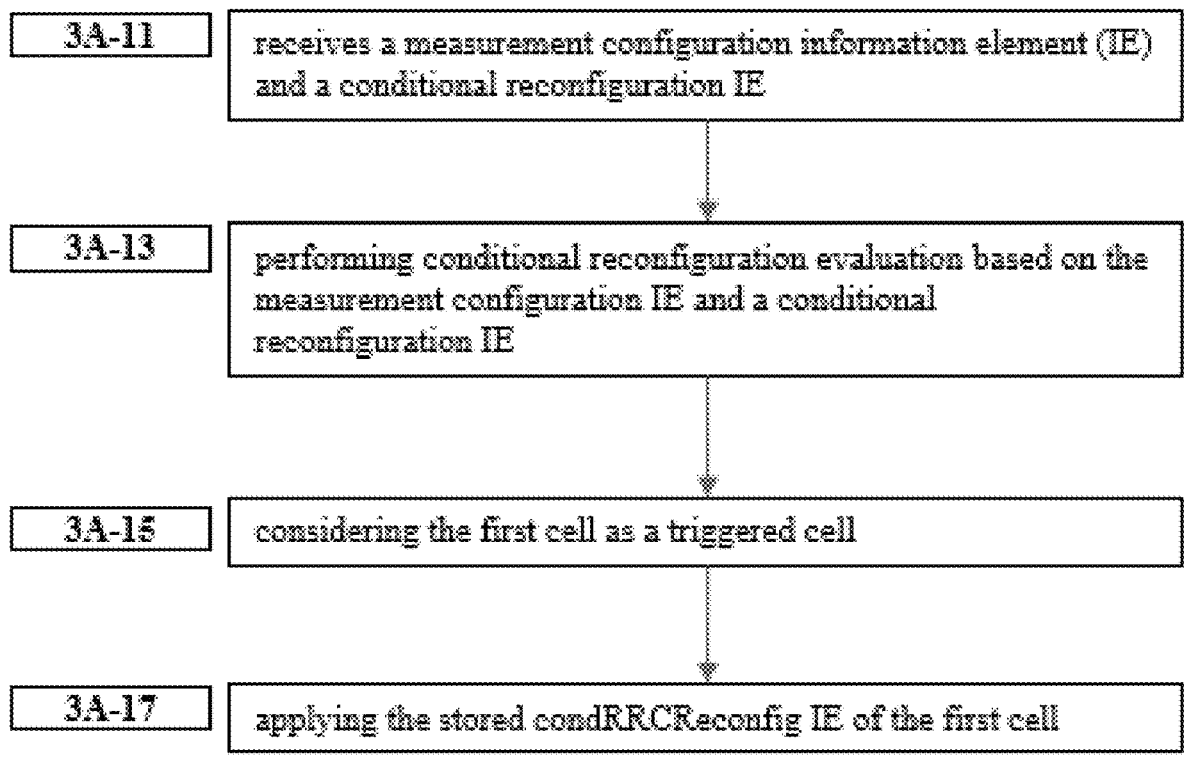
FIG. 3A is a flow diagram illustrating an operation of a terminal.

FIG. 3A illustrates the operation of the terminal.

In step 3A-11, the terminal receives a measurement configuration information element (IE) and a conditional reconfiguration IE from the base station. The measurement configuration IE and the conditional reconfiguration IE may be received through the same RRC control message, or the RRC control message including the measurement configuration IE may be received first and the RRC control message including the conditional reconfiguration IE may be received later.

In step 3A-13, the terminal performs conditional reconfiguration evaluation based on the measurement configuration IE and the conditional reconfiguration IE.

In step 3A-15, if a first event associated with a first measurement identifier and a second event associated with a second measurement identifier are satisfied, the terminal considers the first cell as a triggered cell.

In step 3A-17, the terminal applies the stored condRRCReconfig IE of the first cell and an RRC connection reconfiguration procedure is performed.

The first event is satisfied when the first condition and the second condition are satisfied, and the second event is satisfied when the third condition and the fourth condition are satisfied.

If the sum of the radio hysteresis and the PCell (Primary Cell) measurement result is lower than the first radio threshold, the first condition is satisfied, and if the result of subtracting the radio hysteresis from the measurement result of the first cell is higher than the second radio threshold, the second condition is satisfied.

If the distance between the first reference position and the terminal subtracted by the distance hysteresis is greater than the first distance threshold, the third condition is satisfied, and the sum of the distance between the second reference position and the terminal and the distance hysteresis is smaller than the second distance threshold, the fourth condition is satisfied.

The measurement configuration IE includes the radio hysteresis, the first radio threshold, the second radio threshold, the distance hysteresis, the first distance threshold, the second distance threshold, the first reference position, and the second reference position.

The conditional reconfiguration IE includes the first measurement ID, the second measurement ID, and the condRRCReconfig IE.

The first cell is a cell whose physical cell identifier matches a value of a physical cell identity (PCI) field of the condRRCReconfig IE.

When the RRC connection reconfiguration procedure is initiated, the random access procedure is performed in the first cell in consideration of the distance between the second reference location and the UE.

Figure 4A:
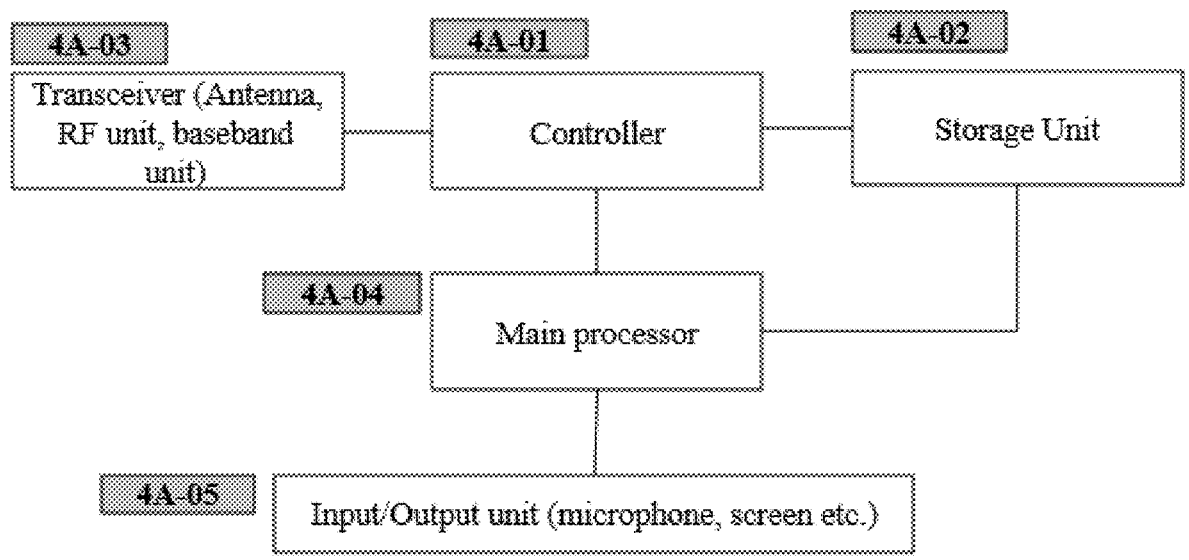
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
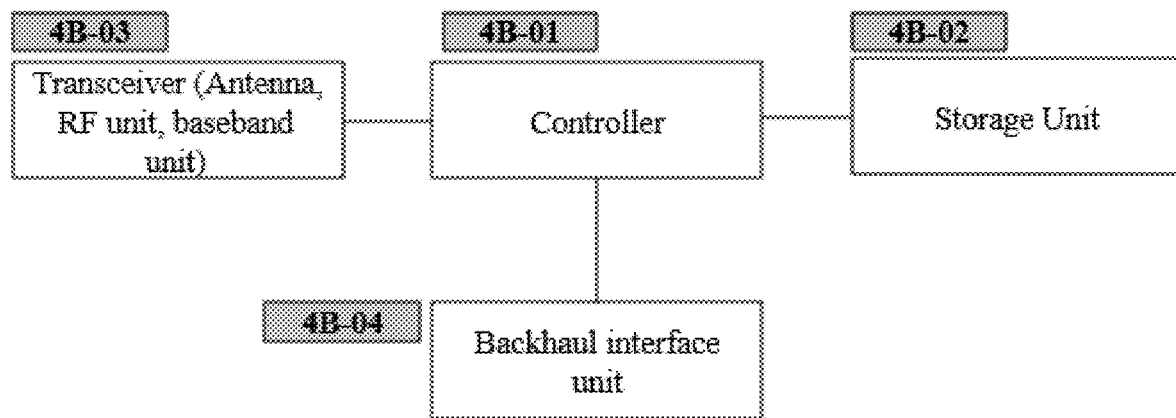
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal, the method comprising:
receiving, by the terminal from a base station, a RRCReconfiguration, wherein the RRCReconfiguration comprises:
  a Measurement Configuration Information Element (IE);
  a Conditional Reconfiguration IE;
  a synchronization signal/physical broadcast channel block measurement timing configuration1(SMTC1) IE; and
  a SMTC3 IE, and
wherein the measurement Configuration IE comprises one or more pieces of information on a measurement identifier, and
wherein the Conditional Reconfiguration IE comprises:
  two measurement identifiers; and
  a condRRCReconfig IE for a first cell;
setting up, by the terminal, a synchronization signal/physical broadcast channel (SS/PBCH) block measurement timing configuration;
performing, by the terminal, a measurement;

performing, by the terminal, a conditional reconfiguration evaluation based on the Measurement Configuration IE and the Conditional Reconfiguration IE;
considering, by the terminal, the first cell as a triggered cell in case that a first event related to a first measurement identifier and a second event related to a second measurement identifier are fulfilled; and
applying, by the terminal, the condRRCReconfig IE of the first cell, and
wherein the first event is fulfilled in case that a first condition and a second condition are fulfilled,
wherein the first condition is related to:
  a first threshold; and
  a value obtained by summing a first hysteresis to a measurement result of a Primary Cell (PCell) measurement result,
wherein the second condition is related to:
  a second threshold; and
  a value obtained by subtracting the first hysteresis from a measurement result of the first cell,
wherein the second event is fulfilled in case that a third condition and a fourth condition are fulfilled,
wherein the third condition is related to:
  a third threshold; and
  a value obtained by subtracting a second hysteresis from a distance between the terminal and a first reference position,
wherein the fourth condition is related to:
  a fourth threshold; and
  a value obtained by summing the second hysteresis to a distance between the terminal and a second reference position,
wherein the SS/PBCH block measurement timing configuration is determined based on an offset and a periodicity and a duration,
wherein the offset is determined based on an offset parameter of the SMTC3,
wherein the periodicity is determined by a joint parameter of the SMTC1, and
wherein the duration is determined based on a duration parameter in the SMTC1.

2. The method of claim 1, wherein the measurement configuration IE comprises:
  a radio hysteresis;
  a first radio threshold;
  a second radio threshold;
  a distance hysteresis;
  a first distance threshold;
  a second distance threshold;
  the first reference position; and
  the second reference position.

3. The method of claim 1, wherein the conditional reconfiguration IE comprises:
  the first measurement identifier;
  the second measurement identifier; and
  the condRRCReconfig IE.

4. The method of claim 1, wherein the first cell is a cell having a physical cell identifier equal to a value indicated in a Physical Cell Identity field of the condRRCReconfig IE.

5. The method of claim 1, wherein the terminal performs a random access procedure in the first cell considering a distance between the terminal and the second reference position in case that a RRC reestablishment procedure is initiated.

6. A terminal in a wireless communication system, the terminal comprising:
  a transceiver configured to transmit and receive a signal, and
  a controller configured to control the transceiver to:
  receive, from a base station, a RRCReconfiguration, wherein the RRCReconfiguration comprises:
    a Measurement Configuration Information Element (IE);
    a Conditional Reconfiguration IE;
    a synchronization signal/physical broadcast channel block measurement timing configuration1(SMTC1) IE; and
    a SMTC3 IE, and
  wherein the measurement Configuration IE comprises one or more pieces of information on a measurement identifier, and
  wherein the Conditional Reconfiguration IE comprises:
    two measurement identifiers; and
    a condRRCReconfig IE for a first cell,
  set up a synchronization signal/physical broadcast channel (SS/PBCH) block measurement timing configuration;
  perform a measurement;
  perform a conditional reconfiguration evaluation based on the Measurement Configuration IE and the Conditional Reconfiguration IE;
  consider the first cell as a triggered cell in case that a first event related to a first measurement identifier and a second event related to a second measurement identifier are fulfilled; and
  apply the condRRCReconfig IE of the first cell, and
  wherein the first event is fulfilled in case that a first condition and a second condition are fulfilled,
  wherein the first condition is related to:
    a first threshold; and
    a value obtained by summing a first hysteresis to a measurement result of the Primary Cell (PCell) measurement result,
  wherein the second condition is related to:
    a second threshold; and
    a value obtained by subtracting the first hysteresis from a measurement result of the first cell,
  wherein the second event is fulfilled in case that a third condition and a fourth condition are fulfilled,
  wherein the third condition is related to:
    a third threshold; and
    a value obtained by subtracting a second hysteresis from a distance between the terminal and a first reference position,
  wherein the fourth condition is related to:
    a fourth threshold; and
    a value obtained by summing the second hysteresis to a distance between the terminal and a second reference position,
  wherein the SS/PBCH block measurement timing configuration is determined based on an offset and a periodicity and a duration,
  wherein the offset is determined based on an offset parameter of the SMTC3,
  wherein the periodicity is determined by a joint parameter of the SMTC1, and
  wherein the duration is determined based on a duration parameter in the SMTC1.

* * * * *